Figure 1:
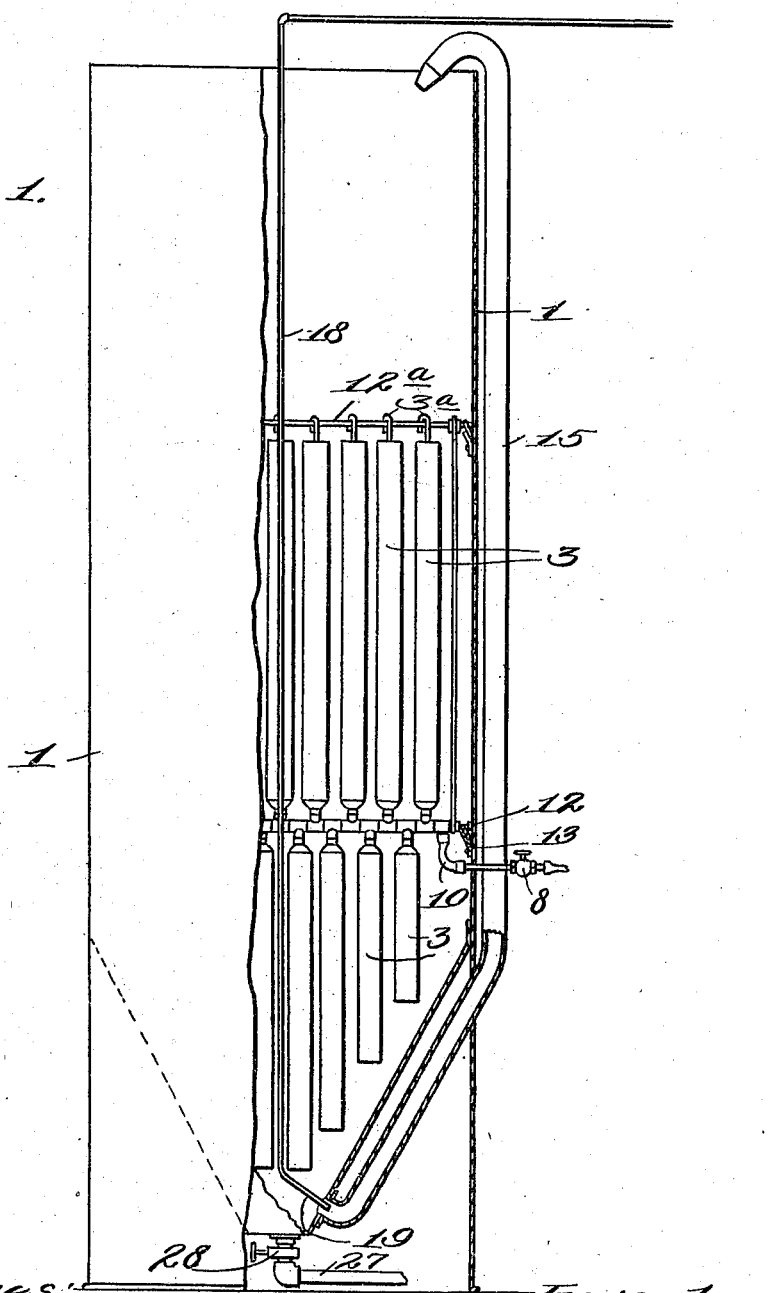

C. H. JAY.
APPARATUS FOR THE TREATMENT OF METAL BEARING SLIMES.
APPLICATION FILED AUG. 11, 1909.

963,710.

Patented July 5, 1910.

4 SHEETS—SHEET 1.

Witnesses:

Inventor
Clyde H. Jay
By James L. Norris
Atty.

C. H. JAY.
APPARATUS FOR THE TREATMENT OF METAL BEARING SLIMES.
APPLICATION FILED AUG. 11, 1909.

963,710.

Patented July 5, 1910.

4 SHEETS—SHEET 2.

Witnesses:

Inventor
Clyde H. Jay
By James L. Norris
Atty.

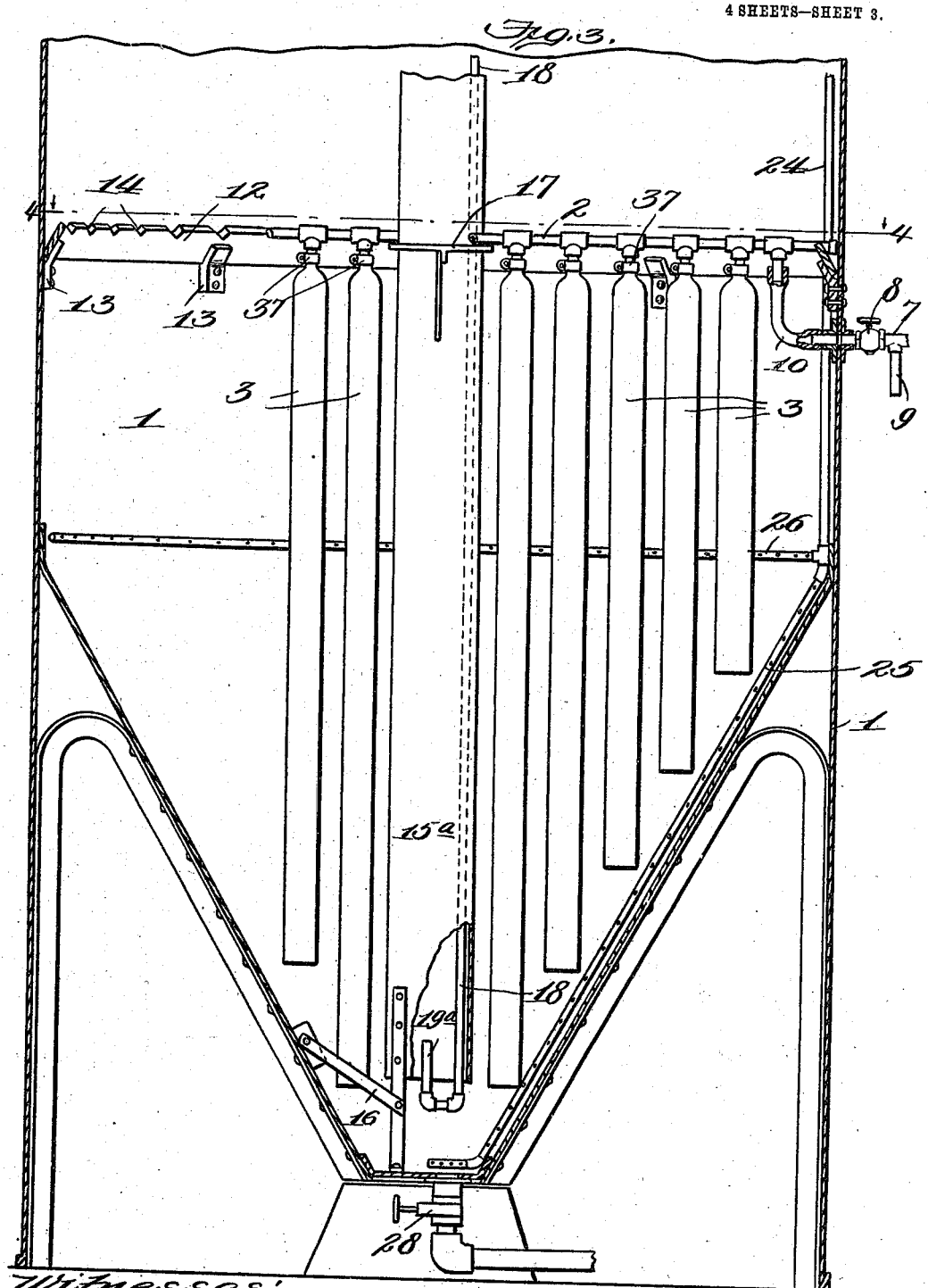

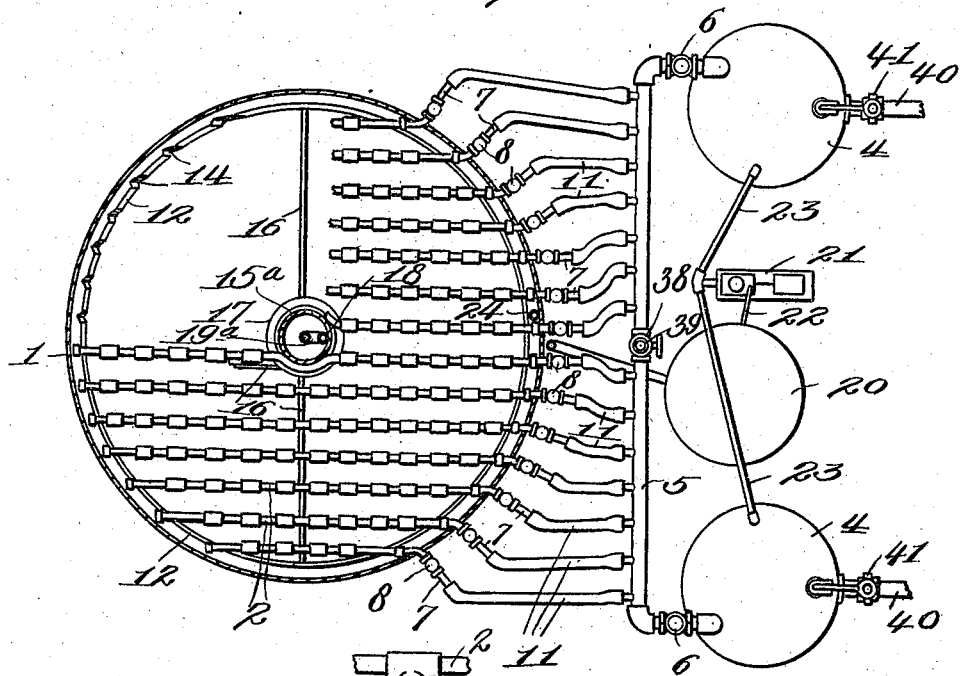

UNITED STATES PATENT OFFICE.

CLYDE H. JAY, OF SALT LAKE CITY, UTAH.

APPARATUS FOR THE TREATMENT OF METAL-BEARING SLIMES.

963,710.

Specification of Letters Patent.

Patented July 5, 1910.

Application filed August 11, 1909. Serial No. 512,342.

*To all whom it may concern:*

Be it known that I, CLYDE H. JAY, a citizen of the United States, residing at Salt Lake City, in the county of Salt Lake and State of Utah, have invented new and useful Improvements in Apparatus for the Treatment of Metal-Bearing Slimes, of which the following is a specification.

This invention relates to new and useful improvements in apparatuses for the treatment of metal bearing slimes and more particularly to an apparatus for filtering the same to remove the metallic values therefrom and to produce a clear metal bearing solution from which the values may be recovered, the solvent liquid being preferably a cyanid solution.

The primary object of the invention is to provide an apparatus which includes a single tank that may be used in the several operations of de-watering the ore, agitating and aerating the ore to effect the production of the metal bearing solution, and separating this solution from the pulp.

A further object of the invention is to provide such novel features of structure and arrangement as will permit of the operation of de-watering being carried on continuously throughout the operation of charging so that by the time the tank is completely charged, the de-watering operation has been completed and the ore is ready for the cyanid treatment.

A further object of the invention is to provide such novel features of structure and arrangement as will permit of the simultaneous separation of the metal bearing solution and the addition of the solvent liquid of the proper strength in order that the filtering operation may be carried on continuously with the solution of the metal values, the consequence being that by the time the values are all in solution, they are practically all filtered from the pulp. Another advantage incident to the simultaneous agitating and filtering operations, as carried out by the present apparatus, is that the formation of the cake which ordinarily "chokes" the filters, is prevented, and the operator is thus enabled to "put through" almost any amount of solution desirable.

The advantages incident to the relation of the several operations in the manner above set forth are that the initial cost of a working plant is reduced to a minimum, since only one tank is required for the several operations detailed; the cost of maintenance of such a plant is likewise reduced, since the apparatus dispenses with the services of a number of the laborers ordinarily employed, also reducing the amount of machinery and providing for the lowest number of tanks consistent with the tonnage treated; and finally the apparatus attains a maximum percentage of extraction in a minimum period of time, for each charge.

The improved apparatus forming the subject matter of the present invention relates to that type in which a battery of filters is placed in a tank through which solution is caused to flow, or in which solution is agitated, and the invention resides in a novel construction and arrangement of the filters and in the combination therewith of novel adjuncts which assist in carrying out the operations referred to.

In the accompanying drawings I have illustrated, by way of example, preferred and advantageous embodiments of the invention.

Figure 2:
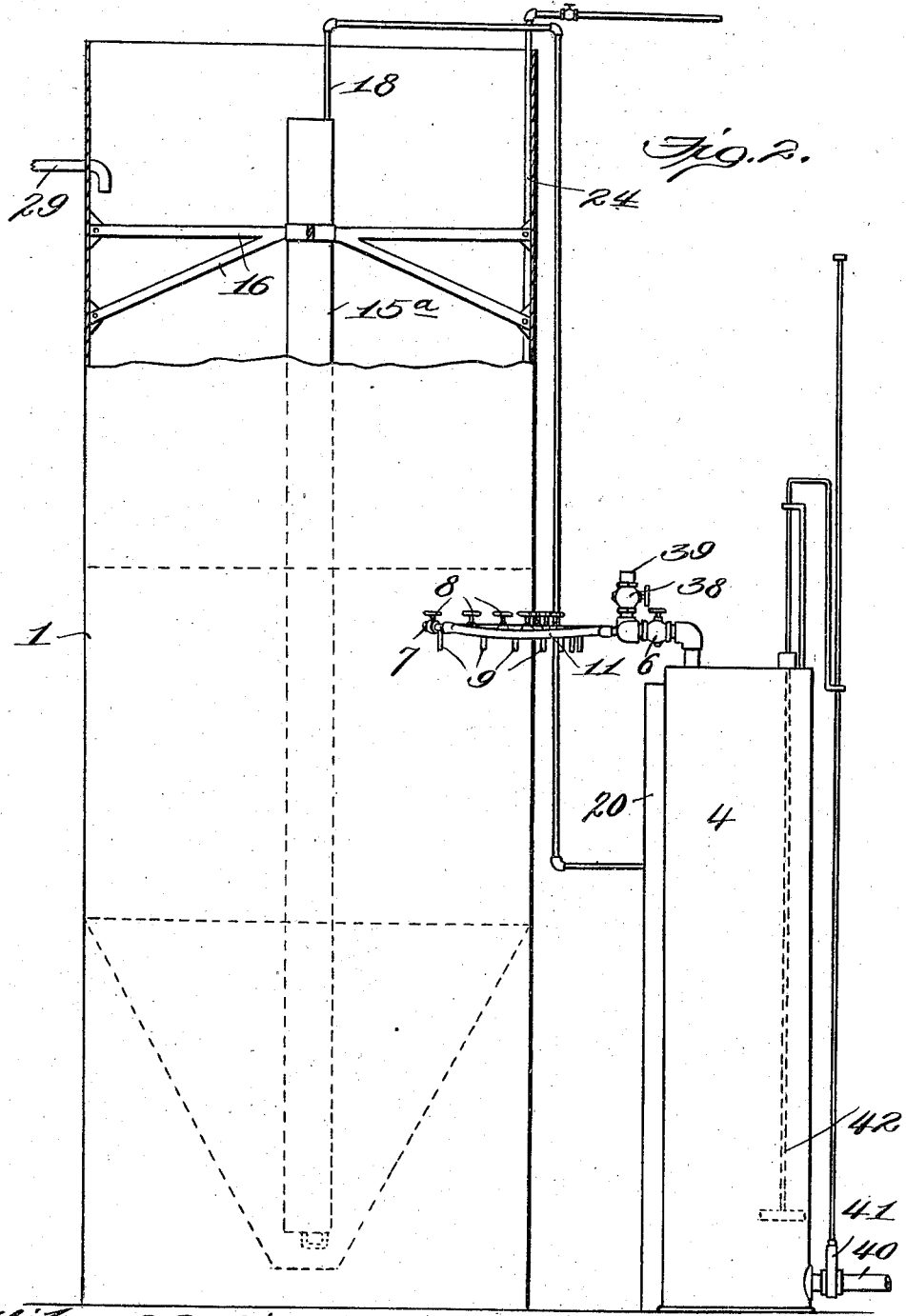

In the said drawings: Figure 1 is a side elevation partly in section, of a preferred form of filter tank constructed in accordance with the present invention. Fig. 2 is a similar view illustrating an alternative construction of filter tank in connection with the other elements of the complete apparatus. Fig. 3 is a detail longitudinal sectional view of the filter tank illustrated in Fig. 2 and in which the several operations referred to are carried out. Fig. 4 is a reduced sectional plan on the line —4— of Fig. 3, parts being broken away for the sake of clearness of illustration, and Fig. 5 is a central longitudinal sectional view of one of the filter members, several of such filter members constituting a filter unit, and several of the units constituting a battery.

Similar characters of reference designate corresponding parts throughout the several views.

The slime filter tank is designated in a general way by the numeral 1 and is preferably, though not necessarily, of the cylindrical conical bottom type. The ore, having been crushed to the proper degree of fineness and passed over amalgamating plates, is conducted directly to a pulp thickening cone (not shown) which is suspended above the filter tank and from which the partly thickened pulp passes to the tank.

The filter battery consists of a number of transversely arranged filter units and each unit comprises a horizontal pipe section, as 2, closed at its ends and to which a plurality of filter members are connected at regular intervals, the filter members being designated in a general way by the numeral 3.

The apparatus, as shown in Fig. 2, includes one or a pair of vacuum tanks, as 4, in which a suction influence is created and this influence is transmitted to the filter members by the following connections. The vacuum tank or tanks 4 are connected to a header 5, which is provided with valves, as 6, to control the communication thereof with the vacuum tanks. A plurality of projecting pipe sections, as 7, are set into or otherwise secured to the wall of the tank 1 adjacent the several pipe sections 2. Each section 7 is provided with a valve, as 8, and with a water glass or equivalent device, as 9. The sections 7 are connected to the respectively adjacent sections 2 by flexible hose sections, as 10, and they are likewise connected to the header 5 by flexible hose sections, as 11. Any filter unit may be cut off from the suction influence in the tank 4 by closing the valve 8 of the section 7 which is joined to said unit. The water glass 9 serves as a leak detector, since any accumulation of slime in said water glass demonstrates that some one of the filter members of the unit with which the water glass is in communication, is defective and leaking, allowing of the passage of suspended solid matter with the solution. Any leakage thus discovered should be promptly remedied and to provide for this, the filter units are individually removable from the tank whereby, in the event of leakage, the defective filter unit may be removed and a new one, equipped with the proper number of filter members, may be substituted. The means for supporting the filter units to provide for such removal and replacement preferably consists of ledges, as 12, one of which is annular and is supported in an inclined position adjacent the wall of the tank by brackets 13 and the others of which are disposed radially or transversely and are supported in a manner to be explained. The ledges 12 are provided with notches, as 14, which are arranged at suitable intervals and into which the sections 2 are set.

The means for continuously agitating and circulating the solution comprises a vertical open-ended pipe, as 15, which in the arrangement shown in Fig. 1, is located exteriorly of the tank 1 and communicates with the top and bottom thereof, and some means for producing a continuous circulation of the mixture through this pipe. The means for producing a continuous circulation of the mixture through the pipe 15 preferably consists of what is known as a "Pohle's air lift", comprising a pipe, as 18, a leg of which is disposed preferably centrally of the tank 1 and terminates at its lower end in an angular extension, as 19, which projects into the lower end of the pipe 15. The said leg projects beyond the upper end of the tank 1 and the pipe 18 is continued for some distance outside of the tank to a point of connection with a tank 20 in which an air compression influence is created.

The apparatus also includes a combined air compressor and vacuum pump, as 21, which is connected to the tank 20 by a pipe, as 22, to create the compression influence therein and to the tank or tanks 4 by a pipe or pipes 23, to create the suction influence therein.

The solvent liquid is introduced into the tank 1 by a pipe, as 24, (Fig. 2) which extends closely adjacent one side of the tank 1 and terminates in an extension 25 that projects along the conical bottom and is provided with a number of small apertures through which the cyanid solution flows into the tank. The pipe 24 is also provided adjacent its point of connection to the extension 25, with an annular horizontal extension, as 26, which is closely associated with the wall of the tank and which is likewise provided with a number of small apertures through which the solution flows. The pipe 24 is connected to two sump tanks (not shown), one of which contains a strong solvent liquid and the other of which contains a weak solvent liquid.

The tank 1, as shown in detail in Fig. 3, is provided at its lower end with an outlet pipe, as 27, having a gate valve 28, through which the tailings are passed. Near its upper end the tank is provided with an overflow pipe, as 29, which, in the event of any undue accumulation of solution due to any unforeseen cause, conducts the excess mixture to another tank similar in all respects to the tank 1 herein described. It will be understood that a battery of such tanks is employed and that they are all connected as a series by the overflow pipes.

It is essential to an efficient and quick dewatering operation that the filter members project to points near the bottom of the tank and in the present case, wherein said bottom is of conical form, the filter members successively increase in depth from the wall toward the center of the tank. It is essential to an efficient filtering operation and also to the efficient circulation of the mixture that the bottom of the tank be unobstructed in order that the flow of the solution may not be retarded and accordingly the filter members are connected at their upper ends to the sections 2 and depend therefrom. It is essential to a saving of power that the discharge ends of the filters be arranged at a low point in the tank, since the greater the distance through which the solution must be elevated, the greater the power required for this purpose. Accordingly, the sections 2 are arranged in a plane slightly above the conical bottom of the tank and, in the case of a very deep tank, this arrangement may still be preserved by the use of an upper battery of filters, the outlet ends of which are connected to the sections 2 herein disclosed. Such an arrangement is shown in Fig. 1 and includes also a frame, as 12ª, for supporting the upper ends of the filter members of the upper battery, the upper filter members having at their upper ends hooks, as 3ª, for engagement with said frame.

In Fig. 2, an alternative arrangement is shown in which the circulation pipe designated by the numeral 15ª is arranged centrally within the tank 1 and is supported by upper and lower stay frames, as 16, of any suitable construction. In this embodiment the radial or transverse ledges 12 are supported on extensions of the brackets 13 and also on a flange or collar, as 17, which is suitably positioned on the pipe 15ª. The pipe 18, in this instance, has a leg which passes through the pipe 15ª and terminates at its lower end in an upwardly directed gooseneck extension, as 19ª, coaxial with the pipe 15 and projecting into the lower end thereof. The arrangement shown in Fig. 1 is preferred since it provides for increasing the number of filter members in the tank 1 but the arrangement shown in Fig. 2 is of advantage in that it may be carried out in connection with slime treating tanks which are already equipped with central circulation pipes and Pohle's air lifts.

The filter members 3 are of the cylindrical type, which, from a broad standpoint, is known in the art, such a type being disclosed in U. S. Patent No. 880,426, granted to H. P. Taylor, February 25, 1908. The filter members 3, however, include details of structure and arrangement which are novel in the art and which are of particular advantage in the present connection. The several filter members are similarly constructed and each includes a section, as 30, of ¼ or ½ inch pipe of the desired length and provided for some distance along its lower end portion with a number of small apertures through which solution flows from the tank 1 into the section 30. The upper end of a section 30 is jointed to a section 2 by a T union. Near the upper and lower ends of the section 30, annular blocks, as 31, are secured. These blocks are preferably of wood, being made an inch in thickness and about two inches in diameter, and their central openings fit snugly against the surface of the pipe 30. Between the blocks 31, one or more blocks 32 are arranged which are similar to the blocks 1 except that their central openings 33 are of considerably greater diameter than the pipe 30 in order to afford a passage for the flow of solution through the filter. The blocks 31 and 32 are held properly spaced by means of a number of vertically disposed wires, as 34, forming in effect a skeleton frame and which are joined rigidly to the blocks 31 and 32 by staples or other suitable fastening devices. The skeleton frame is inclosed in a burlap wrapper, as 35, over which a canvas envelop, as 36, is fitted, the envelop 36 completely inclosing the frame and the burlap wrapper and having its upper end bound about the section 30 by any suitable means, as, for example, a hose clamp 37. All the liquid drawn through the wrappers 35 and 36 seeks the bottom of the filter member and passes into the pipe section 30 through the openings in the lower end thereof. This arrangement assures of the solution being drawn through any accumulation of metalliferous slime which may have collected on the bottom of the tank and furthermore, by inducing a circulation at the bottom of the tank it prevents such accumulation to any material extent.

In use, pulp is introduced into the tank in the manner described and at the same time the pump 21 is started to create a suction influence in the tank or tanks 4, the result of which is that the water or weak solution in which the ore is crushed is drawn from the pulp continuously throughout the charging operation so that by the time the charging operation is completed the pulp is substantially free of moisture and ready for the cyanid treatment. A strong cyanid solution is then introduced into the tank through the pipe 24 and at the same time agitation and circulation are started by opening an air valve and permitting compressed air to flow through the pipe 18 and from thence up through the pipe 15. The mixture in the tank 1 is thus caused to circulate from the lower portion of the tank, through the pipe 15 and from the upper end of said pipe back into the tank. The filtering operation is carried on continuously throughout the period of agitation and circulation, the cyanid solution being admitted as desired into the tank 1 and the solution of metallic values being drawn from said tank through the filter members, sections 2 and connections thereof into the tank or tanks 4. The circulation and agitation of the mixture may be started and stopped at any time and started again in a few minutes, after the pulp has settled for any length of time. The values are filtered as quickly as they go into solution, the result being that by the time all the values are in solution, the filtering operation is completed. When these operations are concluded, agitation and circulation are stopped and moisture is again extracted from the pulp, leaving it ready for treatment with a weak solution.

This operation is in turn carried out and the low values are filtered off. After all the values and cyanid have been extracted, wash water is forced back through the filters into the tank and the parts are thoroughly cleaned. For this operation, the valves 6 which control the communication of the header 5 and the tanks 4, are closed and a valve 38, controlling the communication of said header and a water service pipe 39, is opened. During the cleaning operation, agitation is again started and, the gate 28 having been opened, the tailings are rapidly and easily discharged from the bottom of the filter tank.

The tanks 4 are provided with outlets 40, having valves 41, which may be automatically opened when the liquid in said tanks reaches a determined level, by suitable float operated mechanism, as 42.

Two tanks 4 have been herein shown and may be advantageously employed although under certain conditions only one tank may be necessary.

Having fully described my invention, I claim:

1. In an apparatus of the type set forth, in combination, a filter tank, a horizontal pipe section arranged therein, a filter member communicating with the pipe section and depending therefrom to a point in very close proximity to the bottom of the tank, the filter member discharging into the pipe section at its upper end and receiving solution from the tank, only at its lower end, means for causing the solution in the tank to flow through the filter member and pipe section, and means for receiving the solution from the pipe section.

2. In an apparatus of the type set forth, in combination, a filter tank having a conical bottom, a horizontal pipe section arranged therein, a plurality of filter members communicating with the pipe section and depending therefrom as a common support to points in very close proximity to the conical bottom, the filter members discharging into the pipe section at their upper ends and receiving solution from the tank, only at their lower ends, means for causing the solution in the tank to flow through the filter members and through the pipe section and means for receiving the solution from the pipe section.

3. In an apparatus of the type set forth, in combination, a filter tank, a plurality of filter units in the tank, each of which comprises a pipe section and a plurality of filter members connected thereto, a ledge supporting the pipe sections and permitting of their individual removal and replacement with the filter members attached thereto, means for causing the solution in the tank to flow through the filter units, and means for receiving the solution from the filter units.

4. In an apparatus of the type set forth, in combination, a filter tank, a plurality of filter units assembled therein to constitute a battery, each unit comprising a pipe section and a filter member depending therefrom, means supporting the units to permit of their individual removal and replacement and comprising ledges having notches into which the pipe sections are set, means to cause the solution in the tank to flow through the units, and means for receiving the solution from the units.

5. In an apparatus of the type set forth, in combination, a filter tank, a plurality of pipe sections set into the wall thereof, a common header connected to all of the pipe sections, a tank connected to the header, a valve in each of the pipe sections and a plurality of filter units assembled in the tank to constitute a battery and being individually removable and replaceable, each unit consisting of a pipe and a plurality of filter members connected thereto, each pipe being connected to a correspondingly located pipe section.

6. In an apparatus of the type set forth, in combination, a filter tank, a plurality of filter units therein, a pipe connected to each unit to conduct solution therefrom and a water glass connected to each pipe and serving as a leak detector.

7. In an apparatus of the type set forth, in combination, a filter tank, a battery of filter members therein, means for causing the solution in the tank to flow through and discharge from the filter members, an open ended pipe disposed on the outside of the tank and communicating at its ends therewith and means for delivering compressed elastic fluid medium to the open ended pipe, at the point where the lower end of the latter communicates with the lower end portion of the tank.

8. In an apparatus of the type set forth, in combination, a filter tank, a plurality of filter members disposed therein and having their lower ends in very close association with the bottom of the tank, each filter member receiving solution from the tank only at its lower end, means for causing the solution in the tank to flow through the filter members, and means distant from the bottom of the tank for supporting the filter members, the bottom of the tank being thus unobstructed.

9. A filter member for use in the treatment of metalliferous slimes, comprising a pipe having openings therein, blocks secured on the pipe, rods secured to the blocks and forming a skeleton frame and a foraminous wrapper for the skeleton frame.

10. A filter member for use in the treatment of metalliferous slimes, comprising a pipe having openings therein, blocks secured on the pipe near the ends thereof, rods secured to the blocks and forming a skeleton frame, an intermediate block secured to the rods and having an opening of enlarged diameter surrounding the pipe and a foraminous wrapper for the skeleton frame.

11. A filter member for use in the treatment of metalliferous slimes, comprising a pipe having openings only in the lower end portion thereof, a foraminous wrapper inclosing the pipe for the major portion of its length and means for spacing the wrapper from the pipe.

In testimony whereof I have hereunto set my hand in presence of two subscribing witnesses.

CLYDE H. JAY.

Witnesses:
F. P. BLACK,
J. S. RAMEY.